United States Patent
Beierl et al.

(10) Patent No.: US 11,834,106 B2
(45) Date of Patent: Dec. 5, 2023

(54) AIR CONDUCTION DEVICE FOR A MOTOR VEHICLE

(71) Applicant: Dr. Ing. h.c. F. Porsche Aktiengesellschaft, Stuttgart (DE)

(72) Inventors: Dominik Beierl, Korntal-Münchingen (DE); Joachim Paul, Benningen a.N. (DE); Henrik Heidorn, Renningen (DE); Haiko Neher, Sachsenheim (DE); Moritz Zeh, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 16 days.

(21) Appl. No.: 17/861,401

(22) Filed: Jul. 11, 2022

(65) Prior Publication Data

US 2023/0012129 A1    Jan. 12, 2023

(30) Foreign Application Priority Data

Jul. 12, 2021   (DE) ..................... 10 2021 117 867.3

(51) Int. Cl.
*B62D 35/00*     (2006.01)
*B62D 37/02*     (2006.01)

(52) U.S. Cl.
CPC ........... *B62D 35/008* (2013.01); *B62D 37/02* (2013.01)

(58) Field of Classification Search
CPC .... B62D 35/00; B62D 35/005; B62D 35/007; B62D 35/008
USPC ................................ 296/180.1, 180.3, 180.5
See application file for complete search history.

(56) References Cited

U.S. PATENT DOCUMENTS

| | | | |
|---|---|---|---|
| 9,327,775 B1 | 5/2016 | Guenzel | |
| 9,708,015 B2 | 7/2017 | Dieckmann et al. | |
| 2020/0369331 A1* | 11/2020 | Ferri | B62D 35/008 |

FOREIGN PATENT DOCUMENTS

| | | | | |
|---|---|---|---|---|
| DE | 102008053973 A1 | 5/2010 | | |
| DE | 102008058993 A1 | 5/2010 | | |
| DE | 102009034517 A1 | 1/2011 | | |
| DE | 102013006376 A1 | 10/2014 | | |
| DE | 102013016508 A1 | 4/2015 | | |
| DE | 102015121785 A1 | 6/2016 | | |
| DE | 102017004964 B4 * | 4/2021 | | B62D 35/008 |
| DE | 102021117237 A1 * | 1/2023 | | |
| EP | 3854664 A1 | 7/2021 | | |
| WO | 2015052406 A1 | 4/2015 | | |

* cited by examiner

*Primary Examiner* — Jason S Daniels
(74) *Attorney, Agent, or Firm* — RatnerPrestia

(57) ABSTRACT

An air conduction device for a motor vehicle including an air conduction element and a movement device with adjustment kinematics. The air conduction element is movable relative to the remaining body as at least part of a tail side part of the vehicle body. The air conduction element moves between an inoperative position and at least one final operating position. The tail side part has a flow guiding area along which air flows which is designed to face an area surrounding the motor vehicle. The air conduction element has a surface which is at least part of the flow guiding area. The air conduction element is configured in its final operating position to lengthen the flow guiding area in the direction of a longitudinal body axis (X) of the body. The adjustment kinematics are configured in the form of multipoint joint kinematics.

9 Claims, 3 Drawing Sheets

AIR CONDUCTION DEVICE FOR A MOTOR VEHICLE

CROSS-REFERENCE TO RELATED APPLICATION

Figure 1:
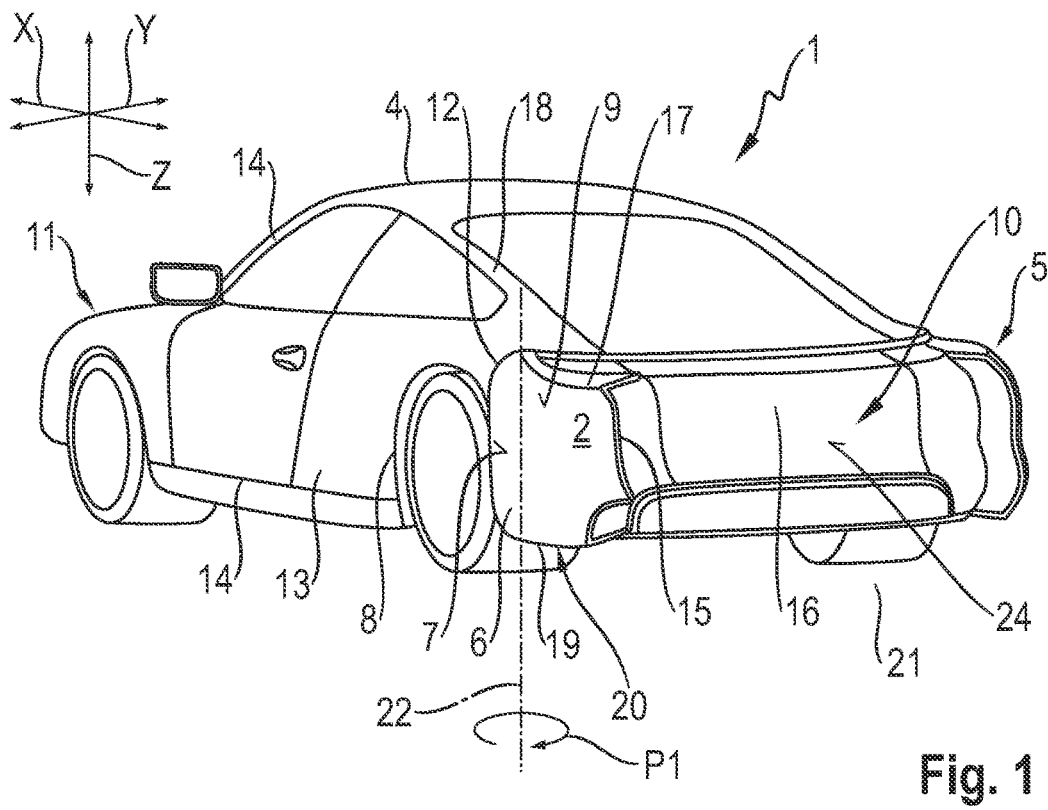

This application claims priority to German Patent Application No. 10 2021 117 867.3, filed Jul. 12, 2021, the content of such application being incorporated by reference herein in its entirety.

FIELD OF THE INVENTION

The invention relates to an air conduction device for a motor vehicle.

BACKGROUND OF THE INVENTION

Air conduction devices for improving stability of the motor vehicle and for reducing fuel consumption due to a reduction in flow losses, in particular in a medium to upper speed range of the motor vehicle, are known in the art. Spoilers, in particular, are used for this purpose and are arranged in a tail region of a motor vehicle body of the motor vehicle and extend along a lateral axis of the motor vehicle.

A further option for reducing flow losses is that of influencing an air flow forming along a side face of the body in a tail region of the motor vehicle body when the motor vehicle is running. The air conduction element is attached to the motor vehicle body for secured setting using selected adjustment kinematics.

DE 10 2008 058 993 A1, which is incorporated by reference herein, discloses a motor vehicle with an air conduction device for cooling components of the motor vehicle which have to be cooled, said air conduction device being arranged on a carrier part in such a manner that it is adjustable between a closed position and an open position, wherein the air conduction device is arranged in an opening of the carrier part and comprises an air flap and a connection guide. The connection guide is designed in the form of a plate, so that when the air conduction element is in a closed position, a through-opening closed by said air conduction element in its closed position can be largely, or completely, closed.

A motor vehicle with a front spoiler formed from an elastomer can be inferred from DE 10 2008 053 973 A1, which is incorporated by reference herein, said front spoiler having a fastening portion, a pivoting portion, and an inflow portion, wherein when the front spoiler in the inoperative position, the inflow portion rests against the fastening portion, and when the front spoiler is in an operating position, the inflow portion is pivoted away from the fastening portion.

DE 10 2013 006 376 A1, which is incorporated by reference herein, discloses a tail spoiler device for a commercial vehicle, said tail spoiler device having a roof air conduction element and a side air conduction element which can be adjusted between an initial position and a driving position by an adjustment mechanism, said adjustment mechanism having simple pivot joints.

A vehicle with a front spoiler can be inferred from DE 10 2013 016 508 A1, which is incorporated by reference herein, said front spoiler being pivotable between an initial position and an operating position, wherein a positioning of the front spoiler in the operating position is dependent on a force of the air acting on said front spoiler and a restoring force of a restoring element.

One disadvantage of the air conduction devices according to the prior art is that additional air resistance is caused, since the air conduction elements are completely spaced apart from the body in their operating position, as a result of which a flow channel in the form of a gap is created between the air conduction element and the body, which flow channel can itself produce breaks in the air flow, and therefore turbulence, on its edges. Air can thereby flow behind the air conduction element.

SUMMARY OF THE INVENTION

An air conduction device of a motor vehicle according to aspects of the invention comprises an air conduction element and a movement device with adjustment kinematics, wherein the air conduction element is movably configured relative to the remaining body as at least part of a tail side part of a body of the motor vehicle. The air conduction element is arranged such that it can be brought into an inoperative position and at least one final operating position. The tail side part has a flow guiding area along which air flows which is designed to face an area surrounding the motor vehicle. The air conduction element has a surface which is at least part of the flow guiding area. The air conduction element is configured in its final operating position to lengthen the flow guiding area in the direction of a longitudinal body axis of the body. The adjustment kinematics are configured in the form of multipoint joint kinematics which have a first joint plane and a second joint plane designed spaced apart from the first joint plane along a vertical body axis of the body, forming a joint gap. According to aspects of the invention, in order to reduce a flow of air behind the air conduction element in the final operating position, the first joint plane and the second joint plane are connected to one another with the help of a connection element. With the help of the connection element, which is at least partially arranged in the joint gap through the connection of the two joint planes spaced apart from one another along the vertical body axis, said joint gap can be advantageously closed for through-flow in the region of the connection element.

It should be mentioned at this point that air conduction elements with a correspondingly large design, in other words air conduction elements which have a large, in particular two-dimensional extent, such as the air conduction element in the form of a tail side part, for example, must be designed with adjustment kinematics with at least two joint planes designed spaced apart from one another, so that a secure and stable adjustment can take place. Likewise, stability of the air conduction element in each position can be achieved.

Insofar as the connection element has a plate-shaped design in the form of a joint plate, the joint gap for the through-flow of air can be completely closed, so that a substantial reduction in the air flowing behind can be achieved. A further advantage is the possibility of reducing components of the adjustment kinematics, which has a drive plane and a guide plane, which are usually designed with the help of two lever arms in each case. By connecting the two joint planes, the drive plane can thereby be configured as a joint plate, and likewise the guide plane can be configured as a joint plate. This further advantageously contributes to a stabilization of the adjustment kinematics.

Insofar as the connection element is advantageously designed in a third joint plane of the adjustment kinematics, which lies transversely to the first joint plane and to the second joint plane, and/or in a fourth joint plane of the adjustment kinematics, which likewise lies transversely to the first joint plane and to the second joint plane, the third joint plane may be designed to receive a drive lever, in order to initiate a movement of the conduction element, and the fourth joint plane may be designed for guidance, or vice versa.

So that smooth-running adjustment kinematics for the reliable positioning of the air conduction element is achieved, the connection element is arranged with the help of a movable connection on the air conduction element and on the remaining body. The movable connection may be designed simply and cost-effectively in the form of a pin/hole connection, for example.

The connection element may be cost-effectively configured as a sheet-metal element.

In order to reinforce the joint plate, said plate has at least one reinforcing rib. Consequently, a securely stable drive and a secured guide can be achieved.

In a further advantageous embodiment of the air conduction device according to aspects of the invention, the air conduction element has a cover element on its undersurface facing away from its upper surface. The advantage should be seen in that a flow of air behind the air conduction element can be avoided at least partially or, with complete closure of a gap formed between the remaining body and the air conduction element, completely, as a result of which the air resistance which is reduced with the help of the air conduction element can be further reduced. Even an only partial closure of the gap brings about an advantageous reduction in air resistance.

The cover element is advantageously fixedly connected to the air conduction element, as a result of which a movement and positioning of the cover element is directly secured with the air conduction element.

BRIEF DESCRIPTION OF THE DRAWING FIGURES

Figure 2:
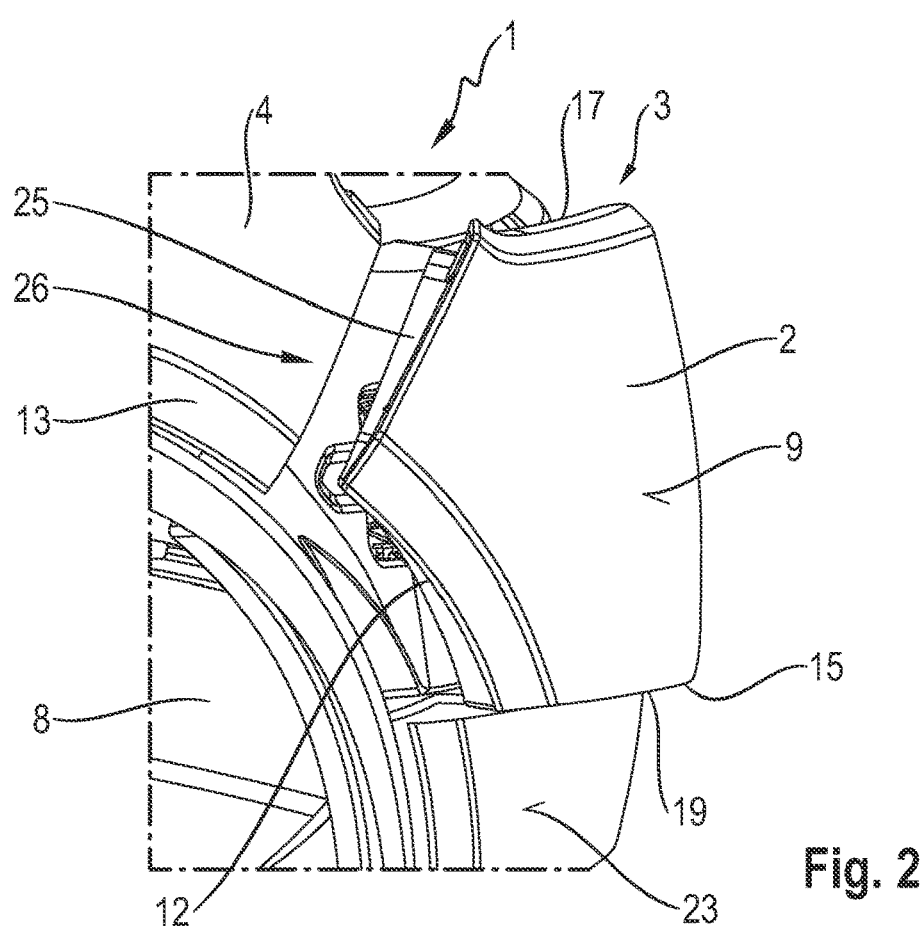
Figure 3:
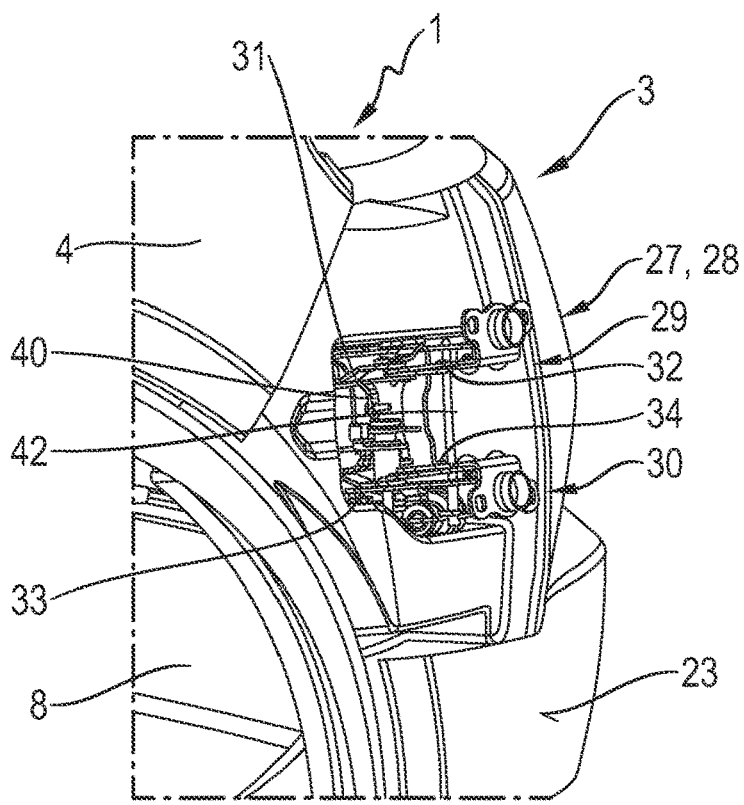
Figure 5:
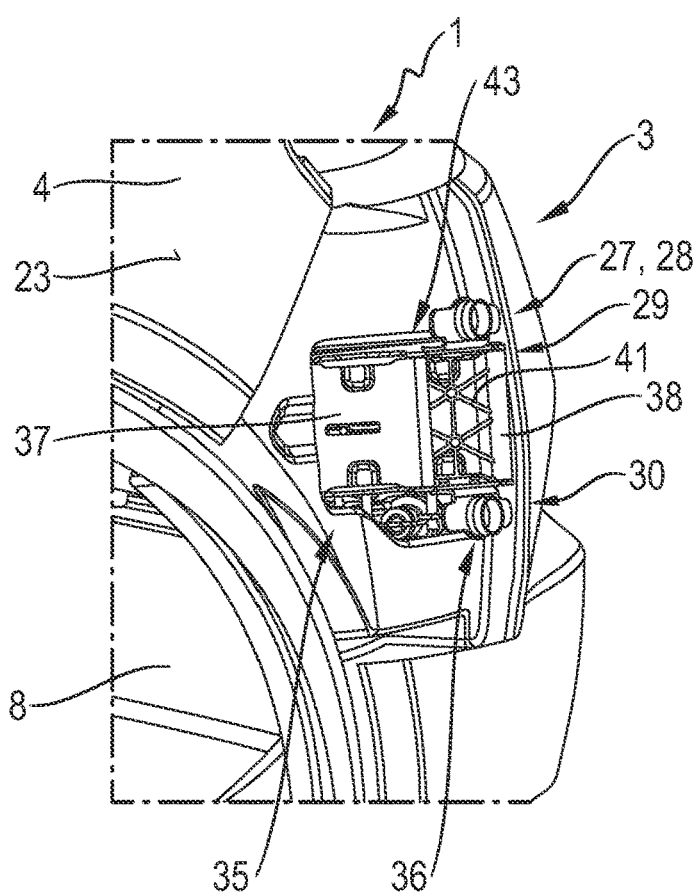
Figure 4:
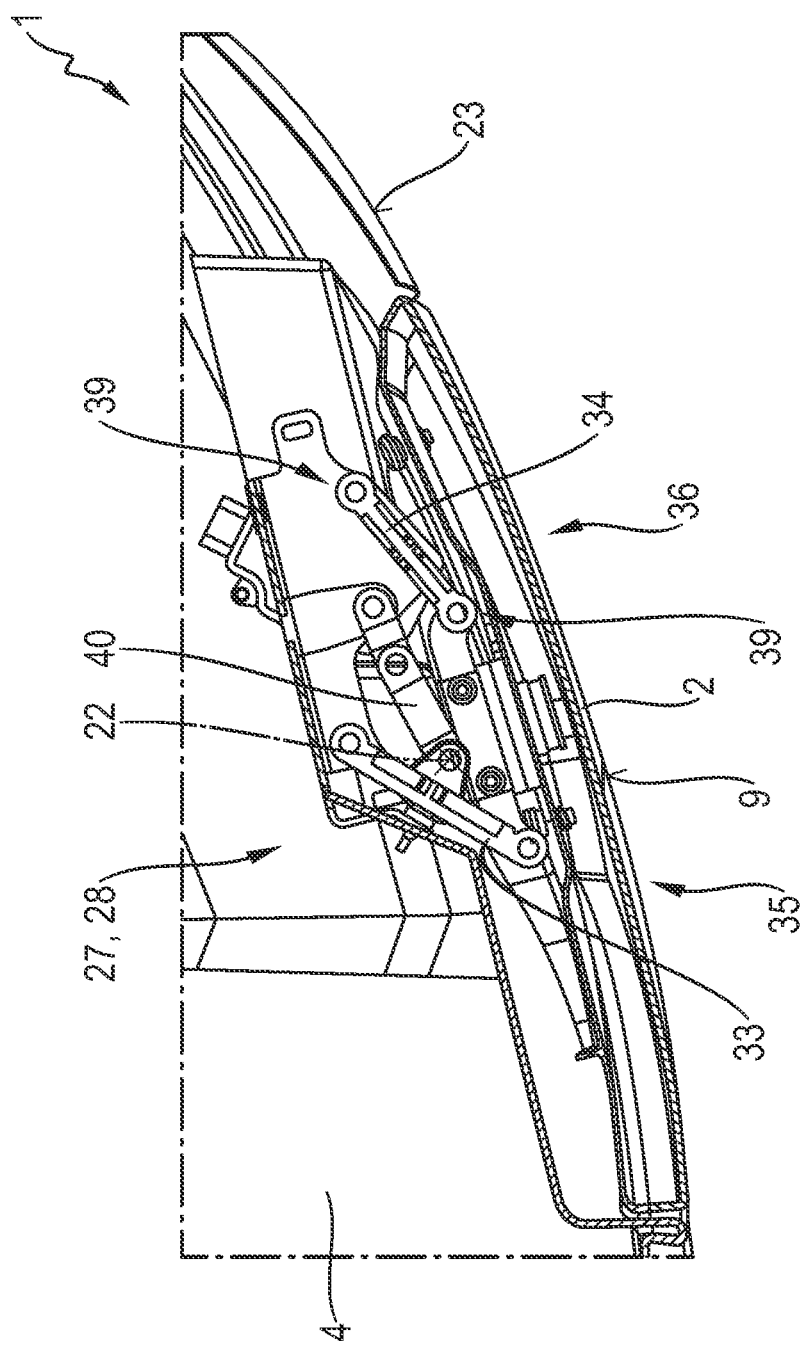

Further advantages, features and details of the invention result from the following description of preferred exemplary embodiments, and also with the help of the drawing. The features and combinations of features referred to above in the description, and also the features and combinations of features referred to below in the figure description and/or in the figures alone, can not only be used in the combination specified in each case, but also in other combinations or in isolation, without departing from the framework of the invention. Identical or functionally identical elements are assigned identical reference signs. In the drawing:

FIG. 1 shows a perspective view of a motor vehicle with an air conduction device according to aspects of the invention in its final operating position with an air conduction element in a first exemplary embodiment, FIG. 2 shows a perspective view of a detail from the motor vehicle with the air conduction device according to aspects of the invention in its final operating position with the air conduction element in its second exemplary embodiment, FIG. 3 shows a perspective view of a detail from a motor vehicle with an air conduction device exhibiting the air conduction element in accordance with the second exemplary embodiment and adjustment kinematics in accordance with the prior art (which is not necessarily an admission of prior art), FIG. 4 shows a perspective plan view of the air conduction device in accordance with FIG. 3, and FIG. 5 shows a perspective view of a detail from the motor vehicle with an air conduction device according to aspects of the invention exhibiting the air conduction element in accordance with the second exemplary embodiment and adjustment kinematics in accordance with the invention.

DETAILED DESCRIPTION OF THE INVENTION

FIG. 1 shows a perspective view of a motor vehicle 1 with an air conduction device 3 in accordance with the invention depicted in a final operating position. The air conduction device 3 comprises an air conduction element 2 and a movement device 27 for positioning the air conduction element 2, wherein the movement device 27 is depicted in detail in FIGS. 3 and 4 with adjustment kinematics 28 in accordance with the prior art and in FIG. 5 with adjustment kinematics 28 in accordance with the invention.

A body 4 of the motor vehicle 1 has a tail end 5 which preferably has a rounded design to reduce an air resistance coefficient or air resistance of the body 4. The air conduction element 2, and its primary action to guide the air flow is, however, dependent on a shape of the tail part 5. The air conduction element 2 forms part of the body 4, but it is movable.

The air conduction element 2 is provided to reduce turbulence in the air flow which can bring about an increase in the air resistance coefficient. For this purpose, the air conduction element 2 is movably configured relative to the remaining body 4, therefore the portion of the body 4 without the air conduction element 2, as at least part of a tail side part 6 or as the tail side part 6 itself. The tail side part 6 has a flow guiding area 7 designed to face the surrounding area, along which flow guiding area air flows, and which flow guiding area conducts said air.

The air conduction element 2 is, in particular in its final operating position, designed to extend the flow guiding area 7 along a longitudinal extent, so in particular along a longitudinal body axis X of the body 4. This means, in other words, that the air conduction element 2 naturally extends, in addition to its extent along the longitudinal body axis X, along a transverse body axis Y and a vertical body axis Z, as a result of which it also has a flow guidance along the transverse body axis Y and the vertical body axis Z, however its function is primarily an extension of the flow guiding area 7 for flow guidance along the longitudinal body axis X. Or, to put it differently, the air conduction element 2 is particularly configured in its final operating position to extend the flow guiding area 7 in the direction of a tail end surface 24 along a longitudinal body axis X of the body 4. The tail end surface 24 could also project.

The tail side part 6 is designed to exhibit at least in part a wheel arch 8 and, depending on the design of the body 4, it may have at least in part a tail light opening not shown in greater detail, and it may have at least in part a bumper 10, and it is furthermore configured adjacent to a side part 13 on its first abutting edge 12 formed facing a front 11 of the body 4, which side part in the present exemplary embodiment has at least in part a door frame 14. Likewise, the first abutting edge 12 is configured in part to form the wheel arch 8. In other words, this means that the first abutting edge 12 of the air conduction element 2 designed in accordance with FIG. 2 may have an angled design similar to the tip of an arrow.

On its second abutting edge 15 facing away from the first abutting edge 12, the air conduction element 2 is configured to be adjacent to a tail center part 16, wherein the tail center part 16, starting from the front 11, has an extent of the body 4 which is greatest in the direction of the longitudinal body axis X. Or, to put it differently, the tail center part 16, viewed from the front 11, represents a rear end of the body 4. The tail center part 16 is configured in a manner extending predominantly in the direction of the transverse body axis Y.

In the direction of the vertical body axis Z, the tail side part 6 is configured with its third abutting edge 17 adjacent to a C-pillar structure 18 of the body 4. A fourth abutting edge 19 of the tail side part 6 is designed facing away from the third abutting edge 17, which abutting edge encompasses the part of the wheel arch 8 and an end edge 20 of the tail side part 6 in relation to a driving surface 21.

At this point, it should be mentioned that the abutting edges 12, 15, 17, 19 of the tail side part 6 need not necessarily be configured to be adjacent to the components of the body 4 referred to above, but instead, these components should only be used for a spatial orientation of the abutting edges 12, 15, 17, 19 to describe the air conduction device 3 according to aspects of the invention. Furthermore, it should be mentioned that a surface 9 of the air conduction element 2 in the inoperative position of said air conduction element 2 may be designed flush with an outer surface 23 of the remaining body 4. Likewise, the surface 9 may be spaced apart from the outer surface 23 in the inoperative position.

In order to position the air conduction element 2 from its inoperative position into its final operating position, at least one pivoting movement about a pivot axis 22 can be executed, wherein the pivot axis 22 extends along, or predominantly along, the vertical axis of the body Z. This means, in other words, that the air conduction element 2 is arranged on the body 4 so as to be pivotable about the pivot axis 22, from its inoperative position into its operating position.

Insofar as the pivot axis 22 does not extend along the vertical body axis Z, it may be configured to form an acute angle with the vertical body axis Z in a manner not depicted in greater detail. Furthermore, and likewise not depicted in greater detail, it may also be designed, depending on its arrangement with the transverse body axis Y, to form a further acute angle and/or to form an additional acute angle with the longitudinal body axis X. Of course the angles are each designed starting from an intersection of the axes X, Y, Z between the axial portions extending in the same direction. This means, in other words, that the pivot axis 22 need not necessarily be precisely configured in respect of the vertical body axis Z, but it may also be arranged obliquely thereto. The pivot axis 22 preferably extends along a chord of the tail side part 6, or parallel thereto, or it is itself curved in accordance with a contour of the tail side part 6.

The air conduction device 3 according to aspects of the invention has the air conduction element 2 in a first exemplary embodiment in the form of the tail side part 6, as depicted in FIG. 1, and in a second exemplary embodiment, as illustrated in FIG. 2, the air conduction element 2 is configured as part of the tail side part 6.

In order to position the air conduction element 2 in its final operating position, said air conduction element 2 is pivoted about the pivot axis 22, as is illustrated with the help of the arrow P1. In other words, the air conduction element 2 is movably arranged on the body 4 and can be brought into the inoperative position and at least its final operating position.

It should be mentioned at this point that the air conduction element 2, starting from its final operating position, is moved into its inoperative position by a movement in the opposite direction to the movement into its final operating position. Insofar as there are two or more movement steps involved in positioning in the final operating position, these are carried out in reverse order in relation to the positioning starting from the inoperative position into the final operating position.

In a further exemplary embodiment not depicted in greater detail, the pivot axis 22 of the air conduction device 9 according to aspects of the invention is arranged transversely to the body axes X, Y, Z, wherein the first abutting edge 12 is pivoted during the positioning of the air conduction element 2 into its final operating position below the adjacent components of the body 4. The second abutting edge 15 and the fourth abutting edge 19 are moved on account of the pivoting about the pivot axis 22 in the opposite direction to the tail center part 16.

The air conduction element 2 is moved into its different positions with the help of the movement device 27, wherein the movement device 27 has the adjustment kinematics 28.

The adjustment kinematics 28, as designed in accordance with the prior art, are designed in accordance with FIG. 3 in the form of multi-joint kinematics and have a first joint plane 29 and a second joint plane 30 which, viewed along the vertical body axis Z in the present exemplary embodiment, are spaced apart from one another. Each joint plane 29, 30 comprises two lever arms in each case, wherein the first joint plane 29 has a first lever arm 31 of the adjustment kinematics 28 and a second lever arm 32 of the adjustment kinematics 28, and the second joint plane 30 has a third lever arm 33 of the adjustment kinematics 28 and a fourth lever arm 34 of the adjustment kinematics 28.

The adjustment kinematics 28 therefore have a third joint plane 35 and a fourth joint plane 36, which include the first lever arm 31 and the third lever arm 33, or the second lever arm 32 and the fourth lever arm 34. The third joint plane 35 and the fourth joint plane 36 are spaced apart from one another in this exemplary embodiment along the longitudinal body axis X. The third joint plane 35 is designed as a drive plane which is movably connected to a drive lever 40, in order to initiate the movement of the air conduction element 2. The fourth joint plane 36 is configured to stabilize the movement and is referred to as the guide plane.

Each of the lever arms 31, 32, 33, 34 has at its end facing the air conduction element 2 a movable connection 39 to said air conduction element 2, as is illustrated, in particular, in FIG. 4. Likewise, each of the lever arms 31, 32, 33, 34 has at its end facing the remaining body 4 a movable connection to said remaining body 4. These connections are configured in the form of simple hole-pin connections.

Since there is a space that can be flowed through between the first joint plane 29 and the second joint plane 30, it is possible, in particular in the final operating position of the air conduction element 2, for air to flow behind said air conduction element 2.

This flow of air behind can at least be reduced, insofar as according to aspects of the invention the first joint plane 29 and the second joint plane 30 are connected to one another with the help of a connection element 37; 38, so that the joint gap 42 formed between the two joint planes 29, 30 is closed. In the present exemplary embodiment, the adjustment kinematics 28 has a first connection element 37 in the third joint plane 35 and a second connection element 38 in the fourth joint plane 36.

The second connection element 38 is used, in particular, to reduce the flow of air penetrating backwards, or in other words via the second abutting edge 15, behind the air conduction element 2.

In the exemplary embodiment shown in FIG. 5, the connection element 37; 38 is designed in the form of a joint plate 37; 38. The joint plate 37; 38 has a plate-shaped design and has at each of its ends facing the joint planes 29, 30 an attachment element 43 to attach to the air conduction element 2 and the remaining body 4. The attachment element 43 may be designed, in its simplest form, in the form of a hole or a pin, wherein the air conduction element 2 and the remaining body 4 have a complementary element creating the connection, consequently a pin or a hole.

The joint plate 37; 38 is formed from sheet metal and has at least one reinforcing rib 41 to increase its strength. The joint plate 37; 38 could also be produced from a plastic.

For the further reduction of a flow of air behind, in particular in the inoperative position of the air conduction element 2, a cover element 25 is arranged at least on the first abutting edge 12, said cover element closing a gap 26 formed between the air conduction element 2 and the remaining body 4. The cover element 25 is preferably configured to close the gap 26 virtually completely, or completely. It may be configured as a composite component to reduce its weight.

The movement device 27 is actuated with the help of a control unit of the motor vehicle which is not represented in greater detail. The movement device 27 could also be configured in the form of a sliding gate. The air conduction element 2 is connected to the movement device 27 with the help of the adjustment kinematics 28.

The positioning of the air conduction element 2 can take place with the help of a pivoting about the pivot axis 22 and a translatory movement along the longitudinal body axis X. Likewise, depending on a shape of the remaining body 4 and a shape of the air conduction element 2, said air conduction element 2 could also only be positioned through a translatory movement in the direction of the longitudinal body axis X.

LIST OF REFERENCE SIGNS

1 Motor vehicle
2 Air conduction element
3 Air conduction device
4 Body
5 Tail
6 Tail side part
7 Flow guiding area
8 Wheel arch
9 Surface
10 Bumper
11 Front
12 First abutting edge
13 Side part
14 Door frame
15 Second abutting edge
16 Tail center part
17 Third abutting edge
18 C-pillar structure
19 Fourth abutting edge
20 Closing edge
21 Driving surface
22 Pivot axis
23 Outer surface
24 Tail end surface
25 Cover element
26 Gap
27 Movement device
28 Adjustment kinematics
29 First joint plane
30 Second joint plane
31 First lever arm
32 Second lever arm
33 Third lever arm
34 Fourth lever arm
35 Third joint plane
36 Fourth joint plane
37 First joint plate
38 Second joint plate
39 Movable connection
40 Drive lever
41 Reinforcing rib
42 Joint gap
43 Attachment element
P1 Arrow
X Longitudinal body axis
Y Transverse body axis
Z Vertical body axis

What is claimed:

1. An air conduction device for a motor vehicle, the air conduction device comprising:
an air conduction element embodied as at least part of a tail side part of a body of the motor vehicle, wherein the tail side part has a flow guiding area along which air flows and which is arranged to face an area surrounding the motor vehicle, the air conduction element being movably mounted relative to a remaining body of the vehicle, wherein the air conduction element is moveable between an inoperative position and at least one final operating position, wherein the air conduction element has a surface which forms at least part of the flow guiding area, wherein the air conduction element is configured, in the final operating position, to lengthen the flow guiding area in a direction of a longitudinal body axis (X) of the body; and
a movement device with adjustment kinematics for guiding movement of the air conduction element between the inoperative position and the at least one final operating position, wherein the adjustment kinematics are multipoint joint kinematics which have a first joint plane and a second joint plane that is spaced apart from the first joint plane along a vertical body axis (Z) of the body, thereby forming a joint gap between the first and second joint planes,
wherein the first joint plane and the second joint plane are connected to one another by way of a connection element in order to reduce a flow of air behind the air conduction element in the final operating position.

2. The air conduction device as claimed in claim 1, wherein the connection element is a joint plate.

3. The air conduction device as claimed in claim 1, wherein the connection element is arranged in a third joint plane of the adjustment kinematics and/or in a fourth joint plane of the adjustment kinematics, wherein the third joint plane is configured to receive a drive lever in order to initiate a movement of the conduction element, and the fourth joint plane is configured for guidance, or vice versa.

4. The air conduction device as claimed in claim 1, wherein the connection element is arranged with the help of a movable connection on the air conduction element and on the remaining body.

5. The air conduction device as claimed in claim 1, wherein the connection element is a sheet-metal element.

6. The air conduction device as claimed in claim 1, wherein the connection element is a joint plate having at least one reinforcing rib.

7. The air conduction device as claimed in claim 1, further comprising a cover element arranged on an undersurface of the air conduction element that faces away from an upper surface of the air conduction element.

8. The air conduction device as claimed in claim 7, wherein the cover element is fixedly connected to the air conduction element.

9. A motor vehicle comprising the air conduction device of claim 1.

\* \* \* \* \*